US009868274B2

(12) United States Patent
Kim et al.

(10) Patent No.: US 9,868,274 B2
(45) Date of Patent: Jan. 16, 2018

(54) ELECTRONIC DEVICE AND METHOD OF FABRICATING EXTERIOR MEMBER FOR THE SAME

(71) Applicant: Samsung Electronics Co., Ltd., Suwon-si, Gyeonggi-do (KR)

(72) Inventors: Myung-Gon Kim, Hwaseong-si (KR); Jong-In Ryu, Suwon-si (KR); Min-Su Chang, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/849,949

(22) Filed: Sep. 10, 2015

(65) Prior Publication Data

US 2016/0113135 A1 Apr. 21, 2016

(30) Foreign Application Priority Data

Oct. 20, 2014 (KR) ........................ 10-2014-0141562

(51) Int. Cl.
| | |
|---|---|
| B32B 37/12 | (2006.01) |
| B32B 37/18 | (2006.01) |
| C03B 27/00 | (2006.01) |
| B29D 99/00 | (2010.01) |
| B32B 37/10 | (2006.01) |
| B32B 7/12 | (2006.01) |
| B32B 17/10 | (2006.01) |
| B32B 17/06 | (2006.01) |
| H04M 1/02 | (2006.01) |
| H04M 1/18 | (2006.01) |
| B32B 3/04 | (2006.01) |

(Continued)

(52) U.S. Cl.
CPC ............ *B32B 37/12* (2013.01); *B29D 99/006* (2013.01); *B32B 3/04* (2013.01); *B32B 7/12* (2013.01); *B32B 17/06* (2013.01); *B32B 17/10018* (2013.01); *B32B 17/10816* (2013.01); *B32B 17/10889* (2013.01); *B32B 37/10* (2013.01); *B32B 37/182* (2013.01); *C03B 27/00* (2013.01); *H04M 1/0202* (2013.01); *H04M 1/0283* (2013.01); *H04M 1/185* (2013.01); *B29K 2709/08* (2013.01); *B29L 2031/3481* (2013.01); *B32B 2457/00* (2013.01)

(58) Field of Classification Search
USPC .......................................................... 174/50
See application file for complete search history.

(56) References Cited

U.S. PATENT DOCUMENTS 3,625,792 A * 12/1971 Shaffer ............. B32B 17/10018
                                                        156/106
5,768,217 A *  6/1998 Sonoda ................ G04B 47/025
                                                        343/718

(Continued)

FOREIGN PATENT DOCUMENTS

| DE | 10 2008 051 429 A1 | 4/2010 |
|---|---|---|
| WO | 2012-037094 A2 | 3/2012 |

*Primary Examiner* — William H Mayo, III
*Assistant Examiner* — Krystal Robinson
(74) *Attorney, Agent, or Firm* — Jefferson IP Law, LLP (57) ABSTRACT

An electronic device and method of fabricating an exterior member thereof are provided. The electronic device includes a basic member disposed on an outside of the electronic device and having an outer surface that is at least partially curved, and a glass film at least partially laminated to the outer surface of the basic member.

23 Claims, 5 Drawing Sheets

(51) Int. Cl.
  *B29L 31/34* (2006.01)
  *B29K 709/08* (2006.01)

(56) References Cited

U.S. PATENT DOCUMENTS

| | | |
|---|---|---|
| 2007/0188826 A1 | 8/2007 | Jones et al. |
| 2009/0117944 A1* | 5/2009 | Lee .................. G06F 1/1624 455/566 |
| 2010/0120473 A1* | 5/2010 | Oh .................... G06F 3/044 455/566 |
| 2010/0231558 A1* | 9/2010 | Kwak ................ G06F 1/1626 345/179 |
| 2013/0000822 A1* | 1/2013 | Kim ................ B32B 17/10816 156/99 |
| 2013/0140965 A1* | 6/2013 | Franklin ............ G06F 1/1626 312/223.1 |
| 2013/0330495 A1 | 12/2013 | Maatta et al. |

* cited by examiner

ELECTRONIC DEVICE AND METHOD OF FABRICATING EXTERIOR MEMBER FOR THE SAME

CROSS-REFERENCE TO RELATED APPLICATION(S)

This application claims the benefit under 35 U.S.C. §119(a) of a Korean patent application filed on Oct. 20, 2014 in the Korean Intellectual Property Office and assigned Serial number 10-2014-0141562, the entire disclosure of which is hereby incorporated by reference.

TECHNICAL FIELD

The present disclosure relates to an electronic device. More particularly, the present disclosure relates to an exterior member, and a method of fabricating an exterior member for the electronic device.

BACKGROUND

An electronic device means a device that performs specific functions according to programs incorporated therein, such as an electronic scheduler, a portable multimedia reproducer, a mobile communication terminal, a tablet personal computer PC, an image/sound device, a desktop/laptop computer, or a vehicular navigation system, including a home appliance. For example, such an electronic device may output information stored therein as a sound or an image. As the integration of electronic devices has increased and a super-high speed and large capacity wireless communication has been popularized, various functions have recently been incorporated in a single mobile communication terminal. For example, in addition to a communication function, an entertainment function such as a game, a multimedia function, such as music/video image reproduction, a communication and security function for, e.g., mobile banking, and a function of schedule management or electronic wallet, are integrated in a single electronic device.

Electronic devices to be used in a portable manner, such as an electronic scheduler, a portable multimedia reproducer, a mobile communication terminal, and a tablet PC, are generally equipped with a flat display device and a battery, and have a bar-type, folder-type, or sliding-type exterior due to the shape of the display device or the battery. Recently, as the electronic devices have been miniaturized with the advancement of electronic telecommunication technologies, electronic devices wearable on a part of a body, such as a wrist or a head, have become commercially available.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a basic member disposed outside the electronic device and having an outer surface that is at least partially formed in a curved surface, and a glass film at least partially laminated to the outer surface of the basic member.

As the use of electronic devices has become common, users' diverse demand may be met by improving the exteriors of the electronic devices to be differentiated from other products. However, while the users' tastes have been diversified, measures for making the exteriors beautiful while diversifying the exteriors have been practically insufficient.

An aspect of the present disclosure is to provide an electronic device, an exterior of which is improved and easily diversified, and a method of fabricating an exterior member for the electronic device.

An electronic device according to the present disclosure may further include a basic member disposed outside the electronic device and having an outer surface that is at least partially formed in a curved surface, and a glass film at least partially laminated to the outer surface of the basic member.

According to the present disclosure, the glass film may be formed of a ceramic material including at least one of glass, transparent ceramic, and sapphire, and may also be formed of a chemically tempered glass.

In accordance with an aspect of the present disclosure, the electronic device is provided. The electronic device may include an ornamental layer, a reinforcement film, or an adhesive between the basic member and the glass film.

In accordance with an aspect of the present disclosure, a method of fabricating is provided. The method includes fabricating an external member of an electronic device by laminating the basic material and the glass film.

An electronic device and a method of fabricating an exterior member for the electronic device, according to various embodiments of the present disclosure, enable the exterior member to be inexpensively and easily manufactured by laminating a film formed of a chemically tempered glass material to a basic member that forms the exterior member, even if at least a portion of the exterior member (e.g., the basic member) is curved. In addition, the manufacturing costs may be reduced and the exterior may be made beautiful by using a glass film without using a tempered glass, which is poor in yield and expensive since processing is required. Furthermore, the exterior of the electronic device may be diversified by forming an ornamental layer inside the glass film.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal terms such as "first" and "second" may be used to describe various elements, these elements are not limited by the terms. The terms are used merely for the purpose to distinguish an element from the other elements. For example, without departing from the scope of the present disclosure, a first component element may be named a second component element. Similarly, the second component element also may be named the first component element. As used herein, the term "and/or" includes any and all combinations of one or more associated items.

Further, the relative terms "a front surface", "a rear surface", "a top surface", "a bottom surface", and the like which are described with respect to the orientation in the drawings may be replaced by ordinal numbers such as first and second. In the ordinal numbers such as first and second, their order are determined in the mentioned order or arbitrarily and may not be arbitrarily changed if necessary.

The terms in various embodiments of the present disclosure are used to describe a specific embodiment, and are not intended to limit the present disclosure. As used herein, the singular forms are intended to include the plural forms as well, unless the context clearly indicates otherwise. In the present disclosure, the terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined differently, all terms used herein, which include technical terminologies or scientific terminologies, have the same meaning as a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

In the present disclosure, an electronic device may be a random device, and the electronic device may be called a terminal, a portable terminal, a mobile terminal, a communication terminal, a portable communication terminal, a portable mobile terminal, a display device, or the like.

For example, the electronic device may be a smartphone, a portable phone, a game player, a television (TV), a display unit, a heads-up display unit for a vehicle, a notebook computer, a laptop computer, a tablet personal computer (PC), a personal media player (PMP), a personal digital assistant (PDA), and the like. The electronic device may be implemented as a portable communication terminal which has a wireless communication function and a pocket size. Further, the electronic device may be a flexible device or a flexible display device.

The electronic device may communicate with an external electronic device, such as a server or the like, or perform an operation through an interworking with the external electronic device. For example, the electronic device may transmit an image photographed by a camera and/or position information detected by a sensor unit to the server through a network. The network may be a mobile or cellular communication network, a local area network (LAN), a wireless local area network (WLAN), a wide area network (WAN), an Internet, a small area network (SAN) or the like, but is not limited thereto.

Figure 1:
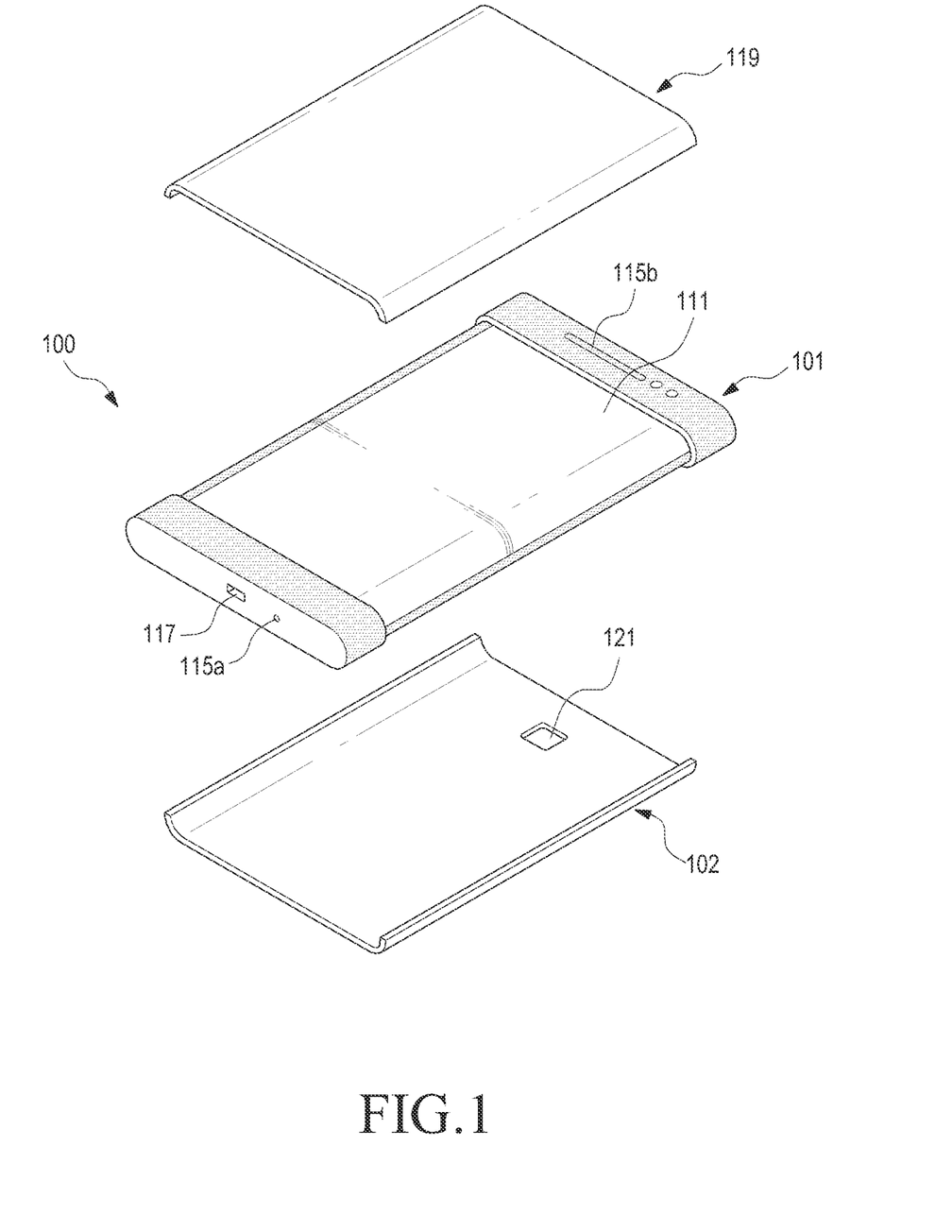
FIG. 1 is an exploded perspective view illustrating an electronic device according to various embodiments of the present disclosure.

FIG. 1 is an exploded perspective view illustrating an electronic device 100 according to various embodiments of the present disclosure.

Figure 2:
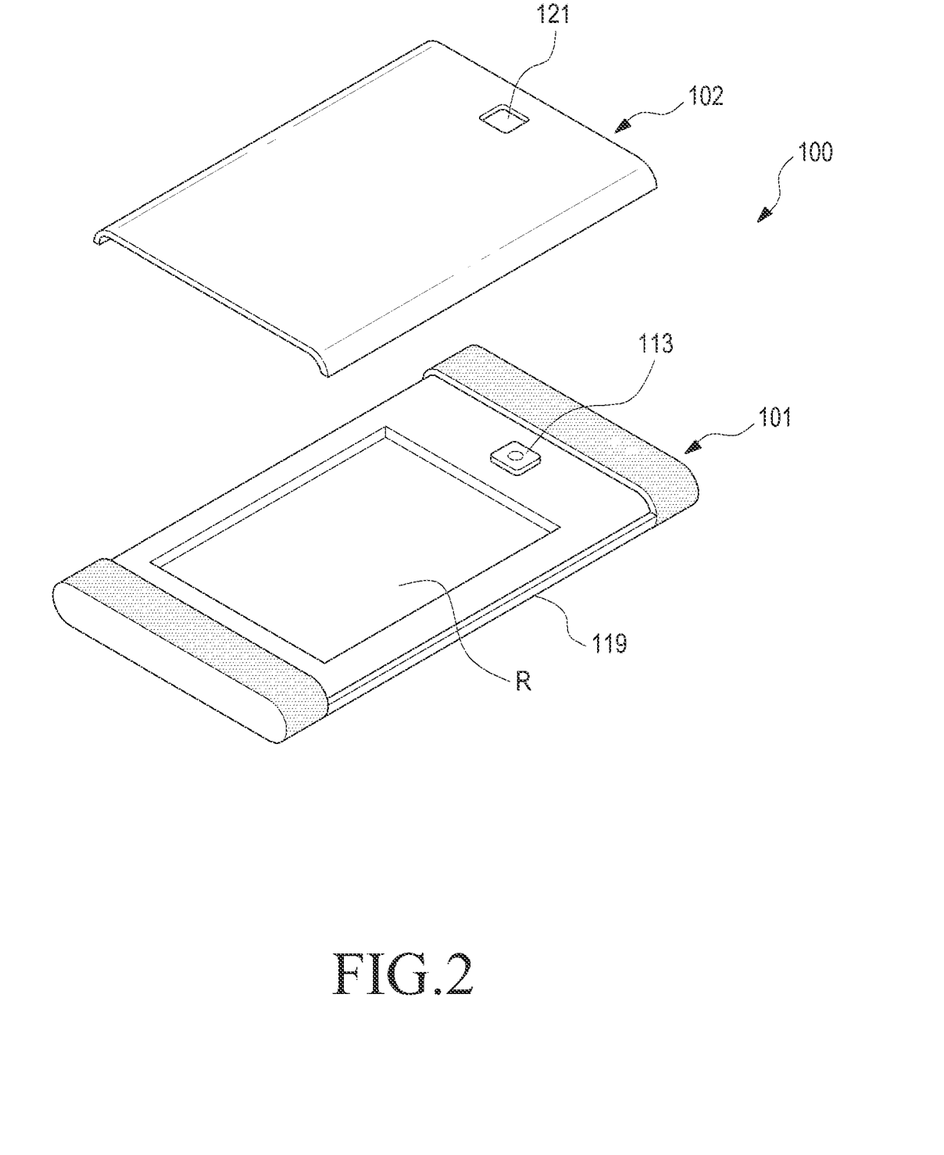
FIG. 2 is an exploded perspective view illustrating the electronic device according to various embodiments of the present disclosure.

FIG. 2 is an exploded perspective view illustrating the electronic device 100 according to various embodiments of the present disclosure.

Figure 3:
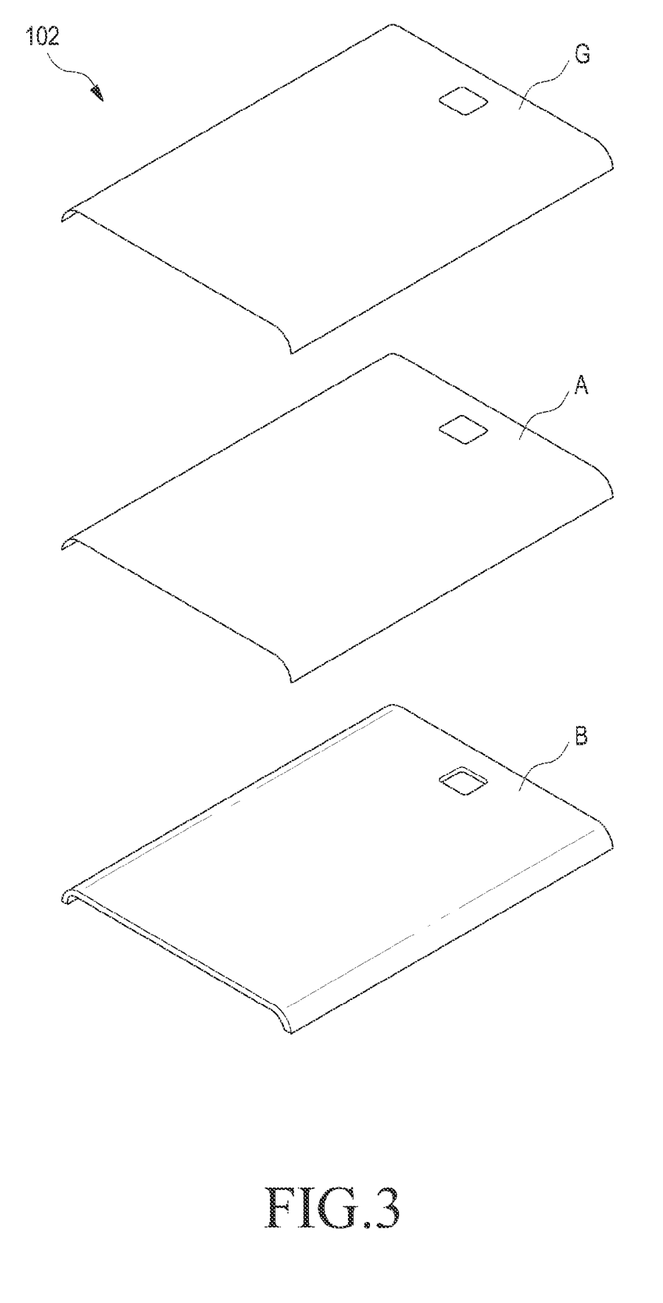
FIG. 3 is a view illustrating an exterior member of the electronic device according to various embodiments of the present disclosure.

FIG. 3 is a view illustrating an exterior member of the electronic device 100 according to various embodiments of the present disclosure.

Referring to FIGS. 1 to 3, the electronic device 100 may include front and rear covers 119 and 102 coupled to the front and rear surfaces of the housing 101, respectively. The housing 101 may accommodate various circuit devices, and a display device 111 may be mounted on the front surface of the housing 101. On the rear surface of the housing 101, a battery recess R for receiving a battery may be formed. In addition, the housing 101 may be equipped with a transmission portion 115a and a reception portion 115b at opposite sides of the display device 111, e.g., at the upper and lower sides of the display device 111, respectively, so as to enable input and output of sounds. In addition, a camera module 113 capable of photographing in a direction opposite to the display devices 111, e.g., in the rear direction may be mounted. On one side surface of the housing 101, e.g., on the bottom side surface, an interface connector 117 may be disposed so as to connect an external power source to the electronic device 100 or connect the electronic device 100 with another electronic device such as a personal computer.

The front cover 119 is mounted on the front surface of the housing 101 so as to protect the display device 111, in which the front cover 119 may be made of a transparent material. For example, the front cover 119 may be made of a tempered glass or a transparent synthetic resin material to allow a screen output from the display device 111 to pass therethrough. When the electronic device 100 is equipped with a touch screen function, a touch panel may be integrated with the front cover 119. According to various embodiments, the touch panel for providing the touch screen function may be integrated with the display device 111.

The rear cover 102 may be provided to be attachable to/detachable from the rear surface of the housing 101. According to various embodiments, the rear cover 102 may be provided as an integrated form with the housing 101. For example, the user may be suppressed from freely removing the rear cover 102 from the housing 101. Although not illustrated, the rear cover 102 may include a radiation element or a resonator for, e.g., short range wireless or wireless power transmission/reception. When the rear cover 102 is provided with the radiation element or the resonator, a means to be connected with the radiation element or the resonator (e.g., a C-clip) provided on the rear cover 102 may be disposed on the rear surface of the housing 101. The rear cover 102 may include an opening 121 to expose the camera module 113 in a state where the rear cover 102 is mounted on the rear surface of the housing 101. When a light source is installed on the housing 101 so as to provide an auxiliary lighting to the camera module 113 according to an illuminance environment, another opening corresponding to the light source may be formed in the rear cover 102.

The rear cover 102 may be utilized as an exterior member that is disposed on the outer surface of the electronic device 100 so as to at least partially implement an exterior design. The rear cover 102 may include a basic member B, and a glass film G laminated to the outer surface of the basic member B. While FIG. 3 exemplifies the rear cover 102 as an exterior member of the electronic device 100, various embodiments of the present disclosure are not limited thereto. For example, the front cover 119 may also correspond to one of the exterior members of the electronic device 100. Since the front cover 119 should allow a screen output from the display device 111 to pass therethrough, the basic member and the glass film that forms the front cover 119 may be made of a transparent material.

The basic member B may be made of a curable material, such as a synthetic resin (e.g., polycarbonate), a ceramic material (e.g., glass, ceramic, transparent ceramic, or sapphire), or a metal (e.g., aluminum or magnesium), and may form a shape of an exterior member, for example, the rear cover 102. The basic member B may include various curves or at least one of the outer surface thereof may be formed as a curved portion to correspond to the exterior shape of the electronic device 100. For example, at least a portion of the periphery of the basic member B (e.g., opposite side edges) may be formed in a curved shape, and the other area may be formed in a flat shape. For example, the exterior color or texture of the rear cover 102 may be variously implemented by forming various patterns or designs on the outer surface of the basic member B and then, performing, e.g., coating thereon.

The glass film G is at least partially laminated to the outer surface of the basic member B so as to make the exterior of the rear cover 102 beautiful. The glass film G may be made of a glass material. In particular, the glass film G may be made of a chemically tempered glass material in order to secure impact resistance. The chemically tempered glass material refers to a glass material, of which the surface hardness is strengthened through chemical tempering based on an ion exchange mechanism. The chemically tempered glass material may be fabricated as the glass film G by processing a glass material to a thickness of 0.01 mm to 0.2 mm, and then substituting a sodium (Na) component contained in the glass material with a potassium (K) component. The glass film G may be fabricated in a sufficiently thin thickness (e.g., 0.01 mm to 0.2 mm) by being subjected to a chemical tempering process so that the glass film G is capable of maintaining a glass texture (e.g., gloss and transmissivity) as well as being flexible, unlike an ordinary glass material. Apart from this, the glass film G may include all the ceramic materials that are transparent and have a high surface hardness, such as a transparent ceramic and sapphire.

When there is an adhesion affinity in laminating the glass film G to the basic member B, the glass film G may be directly laminated to the basic member B. For example, the glass film G may be laminated to the outer surface of the basic member B through a roll laminating method, in which the glass film G and the basic member B are aligned to each other and compressed using a roller. Besides the roll laminating method, the glass film G and the basic member B may also be laminated with each other through a pressing method, in which the glass film G and the basic member B are aligned to each other and then entirely compressed. If necessary, heat may be applied or light (e.g., ultraviolet (UV) rays) may be illuminated so as to facilitate the lamination of the glass film G and the basic member B.

In order to secure a sufficient adhesion affinity between the glass film G and the basic member B, an exterior member, for example, the rear cover 102 may further include an adhesive A. Here, the "adhesive" may include, for example, a heat curable adhesive, a UV curable adhesive, an optical adhesive, or a double-sided adhesive tape. The adhesive A may be interposed between the glass film G and the basic member B so as to rigidly attach the glass film G to the outer surface of the basic member B. After being cured, the adhesive A becomes transparent or translucent so that, even after the glass film G is laminated to the basic member B, the outer surface of the basic member B may be visible to the outside of the glass film G.

According to various embodiments, when the basic member B and the glass film G are formed of a transparent for translucent) material, the front cover 119 may also be fabricated using the basic member and the glass film. When an adhesive is interposed between the basic member and the glass film that form the front cover 119, it is possible to use an optical adhesive that becomes transparent or translucent.

As described above, and as will be discussed in more detail below, an electronic device according to various embodiments of the present disclosure may further include: a basic member disposed outside the electronic device and having an outer surface that is at least partially curved; and a glass film at least partially laminated to the outer surface of the basic member.

According to various embodiments, the glass film may be formed of at least one of glass, transparent ceramic, sapphire, and plastic, and may be chemically tempered. According to various embodiments, the electronic device may further include an adhesive interposed between the basic member and the glass film.

According to various embodiments, the adhesive may include a double-sided adhesive tape.

According to various embodiments, the electronic device may further include an ornamental layer interposed between the adhesive and the glass film, or between the adhesive and the basic member.

According to various embodiments, the ornamental layer may include a pattern formed by at least one of print, deposition, image transfer, and lamination.

According to various embodiments, the electronic device may further include a reinforcement film interposed between the glass film and the basic member; and the adhesive interposed between the glass film and the reinforcement film and between the reinforcement film and the basic member.

According to various embodiments, the reinforcement film may further include a synthetic resin film molded to have a shape corresponding to the outer surface of the basic member.

According to various embodiments, the glass film may be formed in a thickness of 0.01 mm to 0.2 mm.

According to various embodiments, the electronic device may further include a housing, and a rear cover provided on a rear surface of the housing, in which the basic member may form the rear cover.

According to various embodiments, the electronic device may further include a camera module disposed on a rear surface of the housing, and an opening formed in the rear cover so as to expose the camera module.

Hereinafter, an exterior member (e.g., the rear cover) according to more various embodiments and a method of fabricating the exterior member will be described with reference to FIGS. 4 to 9.

Figure 4:
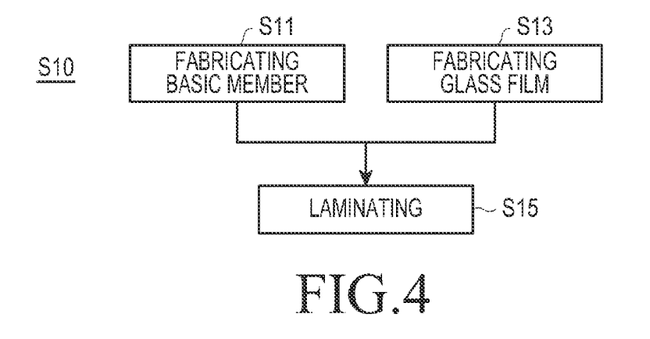
FIG. 4 is a flowchart illustrating a method for fabricating an exterior member of the electronic device according to various embodiments of the present disclosure.

FIG. 4 is a flowchart illustrating a method S10 for fabricating an exterior member of the electronic device according to various embodiments of the present disclosure.

Referring to FIG. 4, the method S10 may further include an operation of fabricating a basic member (e.g., the above-mentioned basic member B) at operation S11, an operation of fabricating a glass film (e.g., the above-mentioned glass film G) at operation S13, and an operation of laminating the fabricated basic member and glass film at operation S15.

Operation S11 of fabricating the basic member is an operation for fabricating the basic member to be suitable for a designed shape using a curable material such as a synthetic resin material, a ceramic material, or a metal material. When the basic member is fabricated using a synthetic resin material, a method, such as injection molding, may be used. When the basic member is fabricated using a ceramic material, a method, such as machining or thermal molding, may be used. When the basic member is fabricated using a metal material, a method, such as die casting, lathe processing, or milling, may be used. The basic member fabricated at operation S11 may have an outer surface that is at least partially curved.

Operation S13 of fabricating the glass film is an operation of fabricating a glass material having a thickness of 0.01 mm to 0.2 mm and then strengthening a surface hardness thereof through chemical tempering. The "chemical tempering" is based on an ion exchange mechanism of substituting a component contained in the glass material (e.g., sodium component) with another component (e.g., potassium component). Through such chemical tempering, it is possible to make the glass film resistant to being cracked or broken even if a bending deformation is caused. For example, the chemically tempered glass film may maintain the glass texture (e.g., gloss or transmissivity) while being flexible. The glass film fabricated at operation S13 may be processed in a size corresponding to the shape of the outer surface of the basic member fabricated at operation S11 or in a size at least partially corresponding to the shape of the outer surface of the basic member. When the exterior member fabricated by the method S10 according to the present embodiment forms the rear cover 102, each of the basic member and the glass film may have a through hole corresponding to the opening 121 formed in the rear cover 102.

Operation S15 of laminating the fabricated basic member and glass film is an operation of laminating the glass film to the outer surface of the basic member through a roll laminating method (or a pressing method). When there is a sufficient adhesion affinity between the fabricated basic member and glass film, the glass film may be directly laminated to the basic member. For example, the fabricated glass film may be aligned to the outer surface of the basic member and then gradually pressing from one side to the other side using a roller so that the glass film may be laminated to the outer surface of the basic member. Since the fabricated glass film is flexible, the glass film may also be smoothly laminated to the curved portion of the outer surface of the basic member. In order to facilitate the lamination of the glass film and the basic member at operation S15, heat may be applied or light may be illuminated while the glass film and the basic member are being pressed. For example, when the heat is applied or light is illuminated during the pressing by the roller, the glass film having a flat shape may be deformed to a shape corresponding to the curved portion of the basic member so that the glass film and the basic member may be rigidly laminated.

The exterior member by the above-described method S10 may improve, for example, the gloss effect due to the glass film fabricated by the chemically tempered glass material and attached to the outer surface thereof. In addition, since the glass film formed of the glass material has a high transmissivity, for example, various patterns may be formed in the inside of the glass film (e.g., on the inner surface of the glass film or the outer surface of the basic member) so as to provide various ornamental effects to the electronic device or the exterior member.

Various embodiments of the method of fabricating the exterior member to be described below may be partially similar to the preceding embodiment. Accordingly, in the following description of the various embodiments, it is noted that configurations that are similar to those of the preceding embodiment or may be easily understood through the preceding embodiment may be denoted by the same reference numerals or the reference numerals thereof may be omitted and the detailed descriptions may also be omitted.

Figure 5:
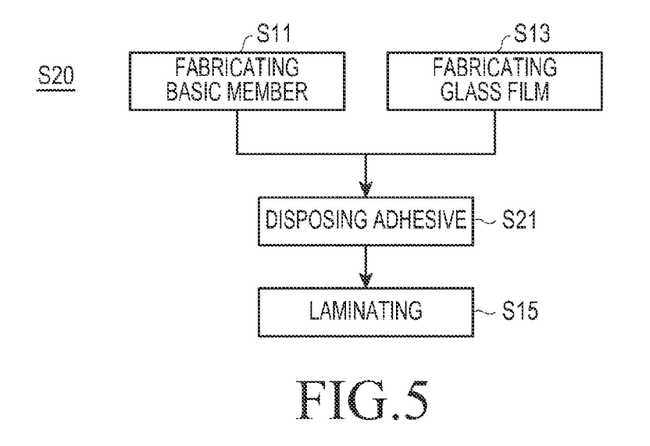
FIG. 5 is a flowchart illustrating a method for fabricating an exterior member of the electronic device according to various embodiments of the present disclosure.

FIG. 5 is a flowchart illustrating a method S20 for fabricating an exterior member of the electronic device according to various embodiments of the present disclosure.

According to various embodiments, an adhesive (e.g., the above-mentioned adhesive A) may be interposed between a glass film (e.g., the above-mentioned glass film G) and a basic member (e.g., the above-mentioned basic material B) so that the glass film may be more rigidly attached to the outer surface of the basic member in laminating the glass film to the outer sauce of the basic member. For example, at operation S21 is an operation of disposing the adhesive between the outer surface of the basic member fabricated at operation S11 and the inner surface of the glass film fabricated at operation S13. The adhesive may be formed in a liquid phase or a film, such as a double-sided adhesive tape.

When the adhesive is formed in a liquid phase, a proper amount of the adhesive may be evenly applied to the outer surface of the basic member or the inner surface of the glass film. When the adhesive is a double-sided adhesive tape in a film form, the double-sided adhesive tape may be cut out to correspond to the shape of the glass film fabricated at operation S13 and first attached to the outer surface of the basic member or the inner surface of the glass film. When an adhesion affinity enabling the lamination of the glass film and the basic member does not exist, or the adhesion affinity is insignificant even if the adhesion affinity exists, the adhesion affinity may be reinforced by providing an adhesive. For example, an adhesive may be disposed between the glass film and the basic member so as to allow the glass film to be rigidly attached and laminated to the outer surface of the basic member.

After providing and arranging the glass film, the basic member, and the adhesive, at operation S15, the glass film may be laminated to the outer surface of the basic member through the roll laminating method. For example, after the glass film, the basic member, and the adhesive are provided and arranged, they are gradually pressed by a roller from one side to the other side so that glass film can be laminated to the outer surface of the basic member. Since the fabricated glass film is flexible, the glass film may also be smoothly laminated to the curved portion of the outer surface of the basic member. At operation S15, in order to facilitate the lamination of the glass film and the basic member, or depending on the curable characteristic of the adhesive disposed between the glass film and the basic member, heat may be applied or light may be illuminated during the pressing by the roller. For example, when the adhesive disposed between the glass film and the basic member is a heat curable adhesive or a UV curable adhesive, the glass film may be laminated to the basic member more rigidly by applying heat or illuminating light.

Figure 6:
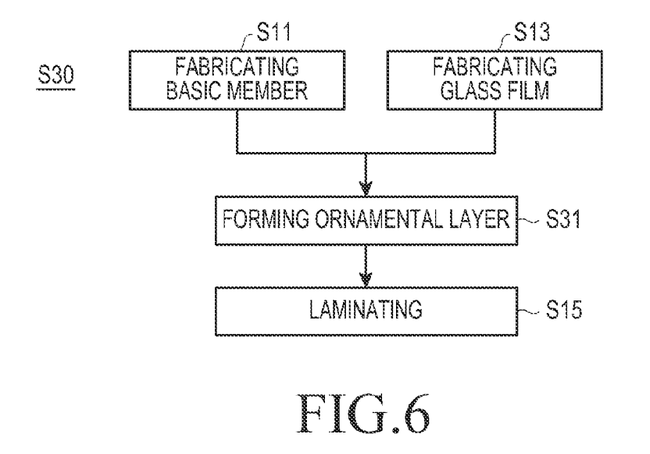
FIG. 6 is a flowchart illustrating a method for fabricating an exterior member of the electronic device according to various embodiments of the present disclosure.

FIG. 6 is a flowchart illustrating a method S30 for fabricating an exterior member of the electronic device according to various embodiments of the present disclosure.

According to the present disclosure, the fabricating method S30 may include an operation of forming an ornamental layer on a fabricated exterior member at operation S31. The ornamental layer of the exterior member may be formed between a basic member (e.g., the above-mentioned basic member B) and a glass film (e.g., the above-mentioned glass film G). The ornamental layer may include various patterns formed on a separate film other than the basic member and the glass film through post-processing processes, such as print, deposition, image transfer, and lamination. According to various embodiments, even if the separate film is not used, the patterns may be formed on the surface of the glass film or the outer surface of the basic member through the post-processing processes. For example, the ornamental layer may be formed in the operation of forming the basic member or the glass film at operations S11, S13, simultaneously with fabricating the basic member or the glass film. Although not illustrated, the fabricating method according to the present embodiment may further include an operation of disposing an adhesive in the preceding embodiment at operation S21.

As described above, according to various embodiments of the present disclosure, a method of fabricating an exterior member of an electronic device may include an operation of disposing (or forming) an adhesive or an ornamental layer interposed between the basic member and the glass film. The operation of disposing the adhesive or the ornamental layer may be properly added by a person ordinarily skilled in the art in consideration of, e.g., an adhesion (or lamination) affinity between the basic member and the glass film and a design of the exterior member to be fabricated.

Figure 7:
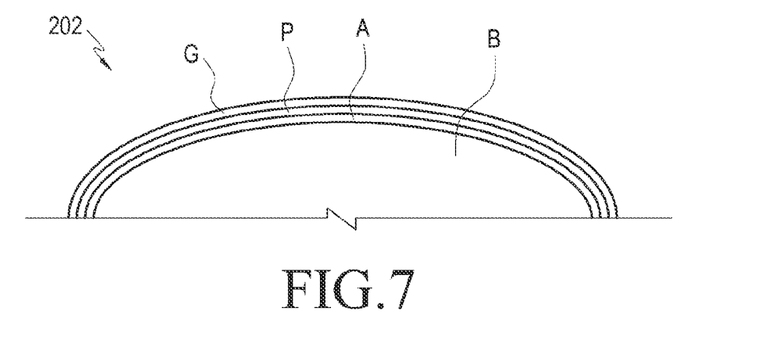
FIG. 7 is a view illustrating a configuration of the exterior member of the electronic device according to various embodiments of the present disclosure.

FIG. 7 is a view illustrating a configuration of the exterior member 202 of the electronic device according to various embodiments of the present disclosure.

Referring to FIG. 7, a sectional configuration of an exterior member 202 (e.g., the above-mentioned rear cover 102) exemplified in the drawing includes an adhesive A and an ornamental layer P interposed between the glass film G and the basic member B. The ornamental layer P may be formed on the inner surface of the glass film G or provided in a form of a film interposed between the glass film G and the adhesive A. For example, the patterns forming the ornamental layer P are visible to the outside through the glass film G so as to provide an ornamental effect. The ornamental layer P may include irregularly or regularly repeated patterns, or a design indicating, e.g., various letters or symbols. In the present embodiment, the ornamental layer P is illustrated in a form of a layer formed separately of the glass film G or the basic member B. However, this corresponds to one of various embodiments of the present disclosure, and the ornamental layer P may also be formed by printing, depositing, transferring, or laminating a desired design on the inner surface of the glass film G or the outer surface of the basic member B.

The ornamental layer P may be positioned outside the adhesive A (e.g., on the inner surface of the glass film G) or inside the adhesive A (e.g., on the outer surface of the basic member B). In the present embodiment, the ornamental layer P is illustrated in the form of a film interposed between the adhesive A and the glass film G. However, the ornamental layer P may also be formed as a film interposed between the adhesive A and the basic member B.

As described above, the adhesive A and the ornamental layer P may be selectively disposed by a person ordinarily skilled in the art in consideration of the design of the exterior member to be fabricated or physical characteristics (e.g., adhesion affinity) of each material (e.g., a material forming the basic member and a material forming the glass film).

Figure 8:
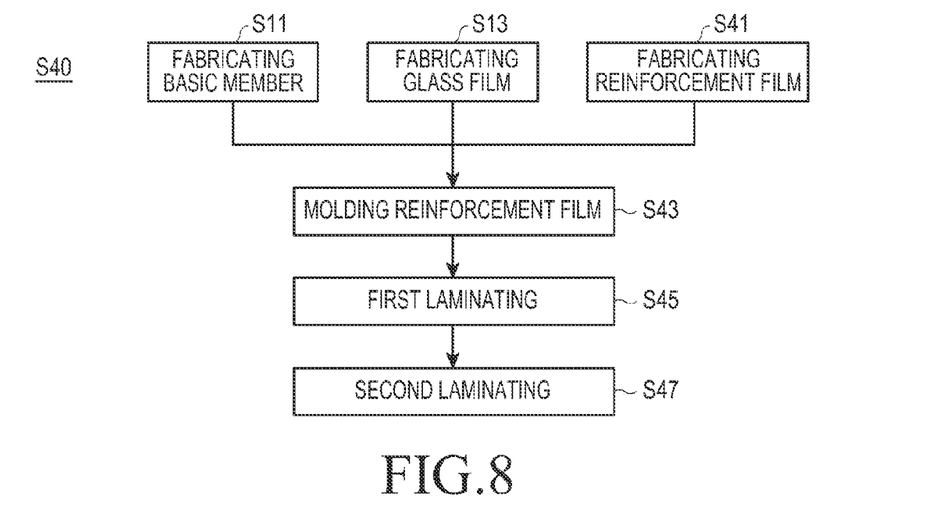
FIG. 8 is a flowchart illustrating a method for fabricating an exterior member of the electronic device according to various embodiments of the present disclosure.

FIG. 8 is a flowchart illustrating a method S40 for fabricating an exterior member of the electronic device according to various embodiments of the present disclosure.

In fabricating the exterior member by laminating a glass film (e.g., the above-mentioned glass film G) to the outer surface of the basic member (e.g., the above-mentioned basic member B), the glass film may be laminated with a reinforcement film and then attached to the outer surface of the basic member in order to improve, e.g., the impact resistance of the glass film. The reinforcement film may include a film formed of a synthetic resin, such as polycarbonate (PC), polymethyl methacrylate (PMMA), or polyethylene terephthalate (PET). In another embodiment, the reinforcement film may further include a film made of a ceramic material, such as a tempered glass that is more tempered than the glass film, a transparent ceramic material, or sapphire. When the ornamental layer is disposed inside the reinforcement film in forming the exterior member, the reinforcement film may be fabricated transparently. When the glass film is laminated with the reinforcement film, the impact resistance of the glass film can be strengthened and the occurrence of cracking or breaking may be suppressed.

Referring to FIG. 8, the basic member, the glass film, and the reinforcement film may be fabricated through processes that are independent from each other, through operations S11, S13, and S41. Prior to laminating the fabricated basic member and glass film with the reinforcement film at operations S45, S47, the reinforcement film may be molded and processed at operation S43 to correspond and form to the shape of the outer surface of the basic member.

For example, when the outer surface of the basic member is a simply flat surface, the reinforcement film may also be processed to maintain the flat shape. When the outer surface of the basic member is at least partially curved, the reinforcement film may also be molded to have a curved surface corresponding to the curved shape of the basic member. Operation S43 of molding the reinforcement film may be simultaneously performed at operation S41 of fabricating the reinforcement film. For example, while FIG. 8 illustrates a configuration in which the operation of molding the reinforcement film at operation S43 is followed after fabricating the reinforcement film at operation S41, the reinforcement film may also be molded to correspond to the shape of the outer surface of the basic member in the operation of fabricating the reinforcement film at operation S41.

Subsequently, in a first lamination at operation S45, the glass film may be laminated to the outer surface of the molded reinforcement film. The lamination of the reinforcement film and the glass film may be performed through a roll laminating process or a pressing process. When the reinforcement film and the glass film are laminated with each other, e.g., the impact resistance and brittleness of the glass film may be improved. In addition, when the glass film is laminated to the molded reinforcement film before being laminated to the basic member, it is possible to prevent the glass film laminated to the reinforcement film from being separated.

When the reinforcement film is laminated with the glass film in the flat plate form without being molded, the entire thickness may become larger than that of the reinforcement film or the glass film. When the reinforcement film and the glass film are laminated in the flat plate form and then laminated to the outer surface of the basic member which includes a curved portion, the reinforcement film and the glass film, which are laminated in the flat plate form, may be deformed to correspond to the shape of the outer surface of the basic member. In the case where there is a difference in displacement between the reinforcement film and the glass film, which have been already laminated in the flat plate form, in the process of such deformation, the glass film may be partially or entirely separated from the reinforcement film. The difference of displacements occurring in the process of deformation (e.g., the difference of displacements caused as the reinforcement film and the glass film are individually deformed) may be proportional to the entire thickness of the reinforcement film and the glass film which have been laminated in the flat plat form. Accordingly, it is possible to prevent the glass film from being separated from the reinforcement film by first molding the reinforcement film to correspond to the shape of the outer surface of the basic member before being laminated to the outer surface of the basic member, and then laminating the glass film to the reinforcement film.

Operation S47 is a second lamination operation of laminating the reinforcement film and the glass film to the outer surface of the basic member in the state where the reinforcement film and the glass film are laminated, in which at operation S47 may be performed through a roll laminating method or a pressing method.

According to various embodiments, the reinforcement film may be laminated to the outer surface of the basic member first and then the glass film may be laminated to the outer surface of the reinforcement film. However, it is possible to further improve the impact resistance or brittleness by laminating the glass film after molding the reinforcement film as compared to the case of laminating the reinforcement film to the basic member first.

Although not specifically described in the present embodiment, the ornamental layers described in the preceding embodiments may be formed on the surface of at least one of the glass film, the reinforcement film, and the basic member. In addition, the ornamental layer may be interposed between the glass film and the reinforcement film or between the reinforcement film and the basic member in a separate film form. When the ornamental layer is positioned inside the reinforcement film, for example, on the inner surface of the reinforcement film or the outer surface of the basic member, the reinforcement film may be formed of a transparent material. When a pattern is formed on each of the surfaces of the glass film, the reinforcement film, and the basic member, different images (symbols or patterns) with different depths may be combined, thereby exhibiting more various visual effects.

Although not specifically described in the present embodiment, an adhesive may be interposed between the glass film and the reinforcement film, and further between the reinforcement film and the basic member. When the adhesive is disposed between the glass film and the reinforcement film and between the reinforcement film and the basic member, the adhesion affinity among the glass film, the reinforcement film, and the basic member can be further improved to be more rigidly attached and laminated to each other.

According to various embodiments of the present disclosure, a method of fabricating an exterior member of an electronic device includes: an operation of fabricating each of a basic member having an outer surface, at least a part of which is curved, and a glass film of a chemically tempered glass material; and an operation of laminating the glass film to the outer surface of the basic member, in which the glass film may be laminated to the basic member by a roll laminating method or a pressing method.

According to various embodiments, the operation of fabricating the glass film may include an operation of forming a glass material having a thickness of 0.01 mm to 0.2 mm into a film, of which a surface hardness is tempered through chemical tempering based on an ion exchange mechanism.

According to various embodiments, the ion exchange mechanism in the operation of fabricating the glass film may include a process of substituting a sodium component contained in the glass material with a potassium component.

According to various embodiments, the method may further include, before the laminating operation, an operation of disposing an adhesive between the basic member and the glass film.

According to various embodiments, the method may further include, before the laminating operation, an operation of forming an ornamental layer between the glass film and the basic member.

According to various embodiments, the operation of forming the ornamental layer may include a process of forming a pattern through at least one of print, deposition, image transfer, and lamination.

According to various embodiments, the method may further include an operation of fabricating a reinforcement film of a synthetic resin material, an operation of molding the reinforcement film into a shape corresponding to the outer surface of the basic member, and a step of laminating the glass film to the reinforcement film.

According to various embodiments, the laminating operation may include an operation of laminating the glass film to the basic member by the roll laminating method in a state where the glass film is aligned with the reinforcement film.

With reference to the exterior member fabricating methods S10, S20, S30, and S40 and FIG. 9, descriptions will be made on the configuration of the exterior member 302 and the method of fabricating the same.

Figure 9:
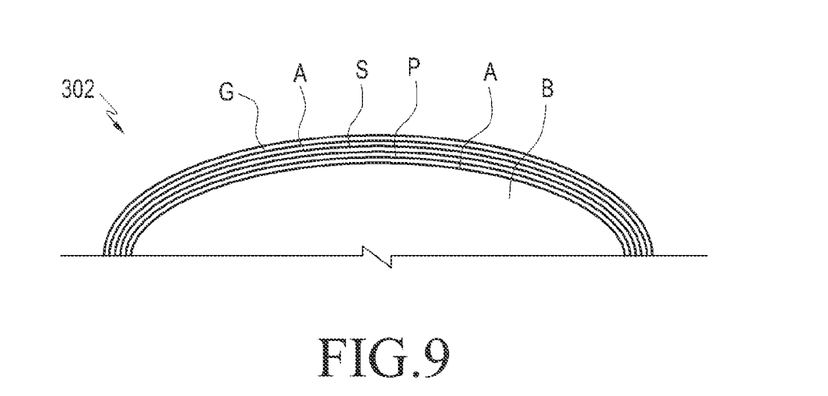
FIG. 9 is a view illustrating a configuration of the exterior member of the electronic device according to various embodiments of the present disclosure.

FIG. 9 is a view illustrating a configuration of the exterior member 302 of the electronic device according to yet another one of various embodiments of the present disclosure.

Referring to FIG. 9, the exterior member 302 may include a glass film G, an adhesive A, a reinforcement film S, an ornamental layer P, and a basic member B.

Each of the glass film G, the reinforcement film S, and the basic member B is independently fabricated through a separate process. The fabricated glass film G, reinforcement film S, and basic member B are laminated with each other to form the exterior member 302, in which the adhesive A is interposed in laminating the fabricated glass film G, reinforcement film S, and basic member B with each other, thereby improving an adhesion affinity. The ornamental layer P may be formed on the surface at least one of the glass film G, the reinforcement film S, and the basic member B or may be provided in a separate film form. In the present embodiment, the ornamental layer P may be interposed between the reinforcement film S and the basic member B.

The basic member B forms the external shape of the exterior member 302 and the outer surface of the basic member B may be at least partially curved. The basic member B may be formed of a synthetic resin or a metal, and the material of the exterior member 302 or the method of processing the exterior member 302 may be properly selected according to the external shape or the use of the electronic device, to which the external member 302 will be applied. According to various embodiments, a pattern for decoration of the exterior member 302 may be formed on the outer surface of the basic member B.

The glass film G is a film having a thickness of 0.01 mm to 0.2 mm and formed of a chemically tempered glass material, and is deformable by bending while maintaining, e.g., the transmissivity and gloss of the glass material. For example, the glass film G resists being cracked or broken due to the chemical tempering processing while having a flexible property. According to various embodiments, the pattern for decoration of the exterior member 302 may be formed on the inner surface of the glass film G.

The reinforcement film S is a film formed of a synthetic resin, such as PC, PMMA, or PET, and may be fabricated transparently. Upon being laminated to the glass film G, the reinforcement film S may compensate for and improve the brittleness (fragile property) of the glass film G. The reinforcement film S may be molded to correspond to the shape of the outer surface of the basic member B before being laminated with the glass film G. According to various embodiments, the pattern for decoration of the exterior member 302 may be formed on the inner or outer surface of the reinforcement film S.

FIG. 9 exemplifies a configuration in which the ornamental layer P is interposed between the reinforcement film S and the basic member B in a separate film form. However, as described above, the ornamental layer P may be formed by, for example, a pattern formed on at least one of the glass film G, the reinforcement film S, and the basic member B.

The glass film G may be laminated to the reinforcement film S after the reinforcement film S is molded into a proper shape. In laminating the glass film G to the reinforcement film S, a roll laminating method or a pressing method may be used. In order to improve an adhesion affinity between the glass film G and the reinforcement film B, the adhesive A may be interposed between the glass film G and the reinforcement film S. The glass film G may be processed to be suitable for the shape of the reinforcement film S through, e.g., mechanical cutting or laser processing before being laminated to the reinforcement film S.

The glass film G and the reinforcement film S may be laminated to the outer surface of the basic member B, in the state where the glass film G and the reinforcement film S are laminated with each other. In laminating the glass film G and the reinforcement film S to the outer surface of the basic member B, in the state where the glass film G and the reinforcement film S are laminated with each other, the roll laminating method or the pressing method may be used, and in order to improve the adhesion affinity between the reinforcement film S and the basic member B, the adhesive A may be interposed between the basic member B and the reinforcement film S.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a basic member disposed on an outside of the electronic device;
    at least a portion of a periphery of the basic member formed in a curved shape;
    a glass film at least partially laminated to an outer surface of the basic member; and
    at least a portion of a periphery of the glass film formed in a curved shape,
    wherein the curved shape of the glass film and the curved shape of the basic member being identical.

2. The electronic device of claim 1, wherein the glass film is formed of at least one of glass, transparent ceramic, sapphire, and plastic.

3. The electronic device of claim 1, wherein the glass film is chemically tempered.

4. The electronic device of claim 1, further comprising:
    an adhesive disposed between the basic member and the glass film.

5. The electronic device of claim 4, wherein the adhesive includes at least one of a heat curable adhesive, an ultraviolet (UV) curable adhesive, an optical adhesive, and a double-sided adhesive tape.

6. The electronic device of claim 4, wherein the adhesive becomes transparent or translucent after being cured.

7. The electronic device of claim 4, further comprising:
    an ornamental layer disposed between the adhesive and the glass film, or between the adhesive and the basic member.

8. The electronic device of claim 7, wherein the ornamental layer includes a pattern formed by at least one of print, deposition, image transfer, and lamination.

9. The electronic device of claim 1, further comprising:
    a reinforcement film interposed between the glass film and the basic member; and
    an adhesive interposed at least one of between the glass film and the reinforcement film and between the reinforcement film and the basic member.

10. The electronic device of claim 9, wherein the reinforcement film further includes a synthetic resin film molded to have a shape corresponding to the outer surface of the basic member.

11. The electronic device of claim 1, wherein the glass film is formed in a thickness of 0.01 mm to 0.2 mm.

12. The electronic device of claim 1, further comprising:
a housing; and
a rear cover provided on a rear surface of the housing, wherein the basic member forms the rear cover.

13. The electronic device of claim 12, further comprising:
a camera module disposed on a rear surface of the housing; and
an opening formed in the rear cover so as to expose the camera module.

14. A method of fabricating an exterior member of an electronic device, the method comprising:
fabricating each of a basic member comprising an outer surface, at least a part of a periphery of which is formed in a curved shape, and a glass film of a chemically tempered glass material; and
laminating the glass film to the outer surface of the basic member,
wherein the glass film is laminated to the basic member by at least one of a roll laminating method and a pressing method, and
wherein heat is applied or light is illuminated during the lamination so that the glass film having a flat shape is deformed to a shape corresponding to a curved part of the basic member.

15. The method of claim 14, wherein the fabricating of the glass film includes forming a glass material having a thickness of 0.01 mm to 0.2 mm into a film, of which a surface hardness is tempered through chemical tempering based on an ion exchange mechanism.

16. The method of claim 15, wherein the ion exchange mechanism in the fabricating of the glass film includes a process of substituting a sodium component of the glass material with a potassium component.

17. The method of claim 14, further comprising:
disposing an adhesive between the basic member and the glass film before the laminating.

18. The method of claim 14, further comprising:
forming an ornamental layer between the glass film and the basic member before the laminating.

19. The method of claim 18, wherein the forming of the ornamental layer includes a process of forming an ornamental pattern through at least one of print, deposition, image transfer, and lamination.

20. The method of claim 14, further comprising:
fabricating a reinforcement film of a synthetic resin material;
molding the reinforcement film into a shape corresponding to the outer surface of the basic member; and
laminating the glass film to the reinforcement film.

21. The method of claim 20, wherein the molding of the reinforcement film is performed when the reinforcement film is fabricated.

22. The method of claim 20, wherein the molding of the reinforcement film is performed when the reinforcement film is laminated on the basic member.

23. The method of claim 20, wherein the laminating includes laminating the glass film to the basic member by the roll laminating method in a state where the glass film is aligned with the reinforcement film.

* * * * *